United States Patent [19]

Longinotti

[11] 4,323,178

[45] Apr. 6, 1982

[54] APPARATUS TO PROVIDE AN EVEN LAYER OR LOOSE MATERIAL TO A SUCTION CONVEYOR

[75] Inventor: Alfredo Longinotti, Florence, Italy

[73] Assignee: Centro Di Ricera Enrico Longinotti Firenze S.p.A., Italy

[21] Appl. No.: 103,504

[22] Filed: Dec. 14, 1979

[30] Foreign Application Priority Data

Dec. 21, 1978 [IT] Italy .............................. 9675 A/78

[51] Int. Cl.$^3$ .............................................. G01F 11/18

[52] U.S. Cl. .................................... 222/415; 198/530; 198/580

[58] Field of Search ................ 222/318, 415; 198/525, 198/530, 532, 580, 859; 425/295-298, 256, 258, 308, 437, 810

[56] References Cited

U.S. PATENT DOCUMENTS

| | | | |
|---|---|---|---|
| 1,151,956 | 8/1915 | Lea | 222/415 |
| 3,067,456 | 12/1962 | Himmelheber et al. | 425/297 |
| 3,970,223 | 7/1976 | Longinotti | 222/306 |
| 4,047,865 | 9/1977 | Axer et al. | 425/308 |

*Primary Examiner*—Robert W. Saifer

*Attorney, Agent, or Firm*—McGlew and Tuttle

[57] ABSTRACT

An apparatus for supplying loose material for making tile-like elements comprising, a conveyor for receiving a continuous layer of the loose material, a loose material supply apparatus for supplying the continuous layer of loose material to the conveyor and a driving unit connected to the conveyor for intermittently driving the conveyor to intermittently move the continuous layer. A material drawing bell is movable mounted with respect to the conveyor and includes a porous diaphragm and peripheral edge extending outwardly therefrom for receiving a tile-size dosage of the material in the continuous layer. A second drive unit is connected to the material drawing bell for moving the bell toward the conveyor to receive the tile-size dosage of material. A suction apparatus is connected to the bell for establishing an underpressure therein so that the tile-size dosage of material is retained against the porous diaphragm.

7 Claims, 9 Drawing Figures

Fig. 9
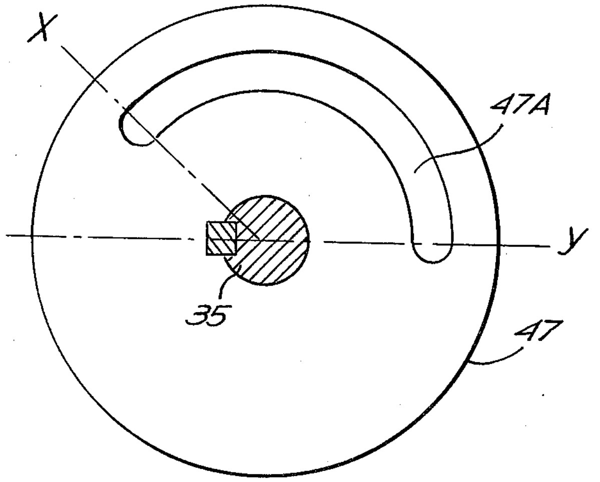
Fig. 7
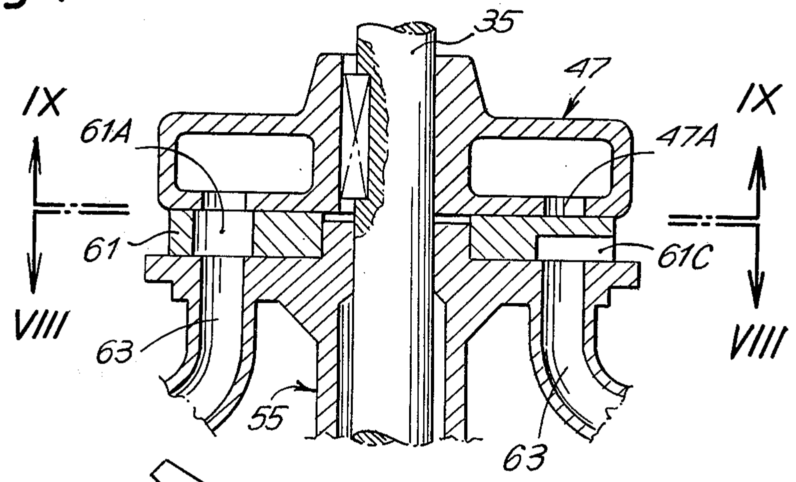
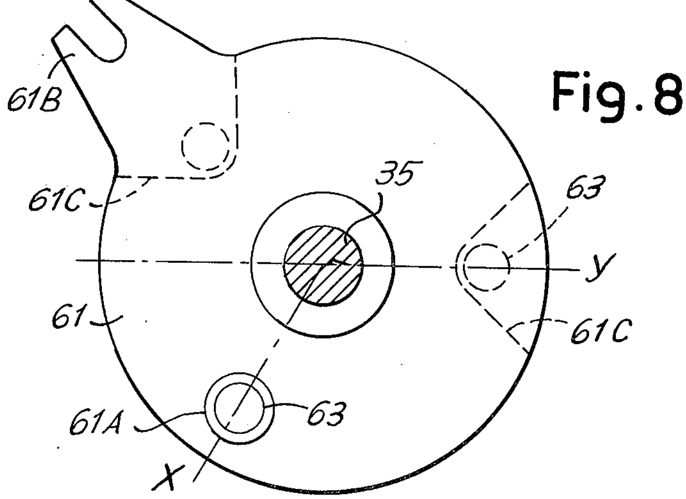
Fig. 8

APPARATUS TO PROVIDE AN EVEN LAYER OR LOOSE MATERIAL TO A SUCTION CONVEYOR

FIELD AND BACKGROUND OF THE INVENTION

The present invention is drawn to an apparatus for providing a layer of loose material in plants for making cement tiles and the like.

According to Italian Patent No. 1,010,613 filed on Apr. 4, 1974 (France No. 7510455 filed on Apr. 3, 1975; Federal Republic of Germany No. P 2513072.7 filed on Mar. 25, 1975; Spain No. 436148 filed on Mar. 31, 1975; U.S. Pat. No. 3,970,223 filed on Mar. 24, 1975; and Japan No. 37042/75 filed on Mar. 28, 1975) there is provided at least one bell-shaped element or the like, which is adapted to be placed under partial vacuum and equipped with a diaphragm or porous wall through which a layer of loose material to be transported is suction-held, and further equipped with a perimetrical edge encircling the diaphragm which must penetrate into a layer of material against which the porous diaphragm rests. The drawing element draws the material from a box movable below and relative to a feedbox. This causes uneveness in the density and compression of the material to be drawn, and therefore uneveness in the manufactured article formed by pressing. The invention prevents this drawback.

SUMMARY OF THE INVENTION

According to the invention, the above mentioned layer of loose material is a continuous layer formed on a conveyor having an intermittent motion, which is stopped periodically below the drawing element, and against which continuous layer the filtering diaphragm rests and in which continuous layer the perimetrical edge penetrates. The conveyor is permeable to air.

The material of the continuous layer can be fed on the intermittently moving conveyor by a feedbox and adjusted in thickness by means of a scraper which is adjustable and which may vibrate.

The conveyor has intermittent motion as already stated, and can be a continuous belt conveyor. In addition, the conveyor can rest on a gas permeable or porous support in the withdrawing area of the material. Below the conveyor a feedbox is advantageously placed for collecting and recovering the rest of material of the continuous layer distributed on the conveyor which was not used.

It should be apparent that the layer has a substantially uniform compression and density, which permits an even formation of the pressed manufactured articles to be obtained.

The invention will be better understood following the description and the annexed drawings, which show a practical non-limitative embodiment of the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

FIGS. 7, 8 and 9 show a detail of FIG. 2, and two views taken alone the lines VIII—VIII and IX—IX of FIG. 7.

DESCRIPTION OF THE PREFERRED EMBODIMENT

Figure 2:
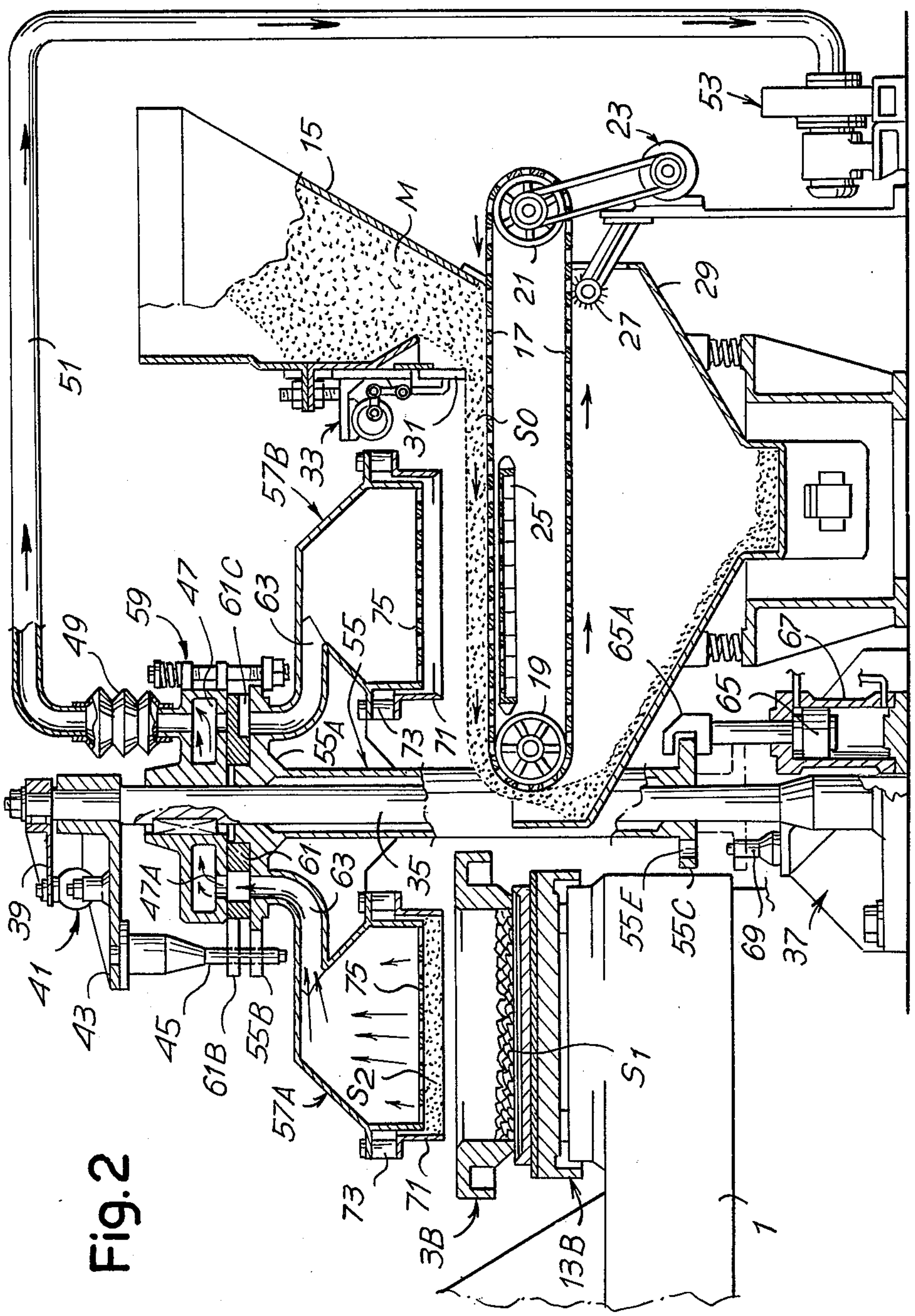
FIG. 2 is a side view in section taken along the broken lines II—II of FIG. 1.

In the annexed drawings, 1 denotes a rotating table typical of a rotary press having several molds or mold frames 3A, 3B, 3C, in the various positions which are reached by each of them. The position of the frame 3B is that of loading of the so-called second layer or underlayer of the cement tile. As shown in FIG. 2, 13B denotes the bottom of the frame in position 3B. The table 1 rotates stepwise in the direction of the arrow f1, to lead each mould into the various positions. A mould in the position 3A has received the material of the surface layer S1 and then is moved to the position 3B-13B to receive the material of the second layer or underlayer denoted by S2 (FIG. 2), in order to be moved afterwards to the position 3C and the subsequent ones for the pressing and the drawing steps.

The apparatus to be described effects the automatic loading of the material of the second layer S2 and the dosage of the same, within a relatively short time, that is, a time which will not delay the production rhythm of the plant, and with the maximum uniformity of distribution of the material and compactedness of the same.

In correspondence with the position 3B, a tank is provided for the feeding of the second layer material, with an arrangement oriented according to a certain inclination with respect to the radial direction defining the position 3B of the mould which must receive the underlayer or second layer S2. This tank has a hopper 15 overhanging a continuous flexible belt conveyor 17, which is moved back by rollers 19, 21. This conveyor is operated to rotate intermittently by a power unit or first drive means 23 which can operate the plant with intermittent movement. The flexible belt conveyor 17 is porous, that is air-permeable, and its upper horizontal active arm or run may slide upon a support 25 which is also porous, so that it is air-permeable. A brush 27 may operate on the lower run of the belt 17. Below the conveyor belt 17 a conduit or a collection hopper 29 is provided for the excess of material which must be carried away or lead back to the hopper 15. At least the conduit or the hopper 29 may be vibrated. From the hopper 15 the material M, which is to form the underlayer, is fed in the form of a layer S0 on the conveyor belt 17 and the thickness of this layer S0 may be adjusted by displacing a scraper 31 with an adjustment device 33, which allows a vertical displacement of this scraper and, advantageously, also its vibration, to make the formation of the layer S0 even.

In a substantially radial alignment with the mould in position 3B and outside the table 1, a column 35 is placed which is borne by a base 37 and whose upper part may also be supported. With the upper portion of the column 35 an arm 39 is integral, to which one of the two elements of a cylinder-piston system 41 is fixed.

The other element of system 41 is pivotally connected to an arm 43 idly borne by the column 35. With the arm 43, a coupling pin 45 is integrally connected, which extends vertically and therefore parallel to the column 35, for the purposes and the functions described below. This coupling pin 45 is angularly but not axially movable with respect to the column 35.

On the column 35 a collector 47 is engaged, which is axially displaceable on the column, but which is engaged to it to be angularly stable. The collector 47 is connected through a bellows 49 with a conduit 51 leading to the suction side of a suction pump 53.

An element 55 is mounted on the column 35 for sliding and rotary motion. Element 55 forms a turret which includes three bells 57 angularly equidistant from one another with respect to the axis of the column 35. Each bell can subsequently reach three positions, which are shown at 57A, 57B and 57C. The bell in position 57A is set above the frame 3 of the mould in position 3B. The bell in position 57B is set above the active arm of the conveyor belt 17 and in correspondence with the support 25. The bell in position 57C is in a waiting position. The equipment 55, bearing the bells 57, is axially connected to the collector 47 with suitable resilient connection means 59 or the like, so that between the collector 47 and an upper plate 55A of the equipment 55 at a sealing pressure, a movable shutter 61 is interposed. From the plate 55A connections 63 extend between the bells 57 and the surface of the plate 55A connected to the shutter 61. This shutter 61 has a bore 61A, which may be displaced by 120°, as it can be appreciated comparing FIGS. 1, 4 and 7 and as it appears from FIGS. 7 and 8. Considering these figures it is clear that the shutter 61 and therefore the bore 61A may be displaced between two radially fixed alignments shown at X and Y, the alignment X corresponding to that between the column 35 and the angular displacement axis of platform 1, while the alignment Y corresponds to that of the symmetry vertical plane of the assembly 15, 17. The shutter 61 has a radial fork appendix 61B, within which the connecting pin 45 is engaged, and with respect to which pin the fork appendix 61B can move in parallel to the axis of the pin 45. Also the plate 55A of the equipment 55 has a fork or bore-like appendix 55B, which may engage the pin 45 in a lowered position of the equipment 55. The collector 47 has an opening 47A (see in particular FIG. 7) which extends at least between the above mentioned angular positions X and Y. The shutter 61 has two recesses 61C on the lower connection surface with plate 55A. These recesses 61C are moved so as to enable the presence of one of them to alternatively be in the positions 57A and 57B, with the displacement of member 61 for an angular magnitude substantially corresponding to the angle between the two radial alignments X and Y.

The cylinder-piston system 41 can move the pin 45 by an angular length with respect to the column 35 equal to the angle comprised between the two alignments X and Y.

The equipment 55 has in its lower part a flange 55C, which is engaged in an angularly movable manner by the moulded end 65A of the stem of a piston 65 of a cylinder-piston system, whose cylinder 67 is integral with the base 37. The system or second drive means 65, 67 serves to raise and lower the equipment 55 and therefore the bells 57, while allowing their rotation. The flange 55C has a bore 55E capable of cooperation with a fixed centering pin 69, when the equipment 55 is lowered.

Each of the bells 57 has a perimetrical edge 71, which is carried by the structure of the respective bell through replaceable thicknesses or spacers 73 for the arrangement of the position of the edge 71 and therefore for the dosage of the underlayer S2. The adjustment of each of the edges 71 is effected with respect to a porous diaphragm, that is to a porous wall 75 in the lower part of each bell 57. The edge 71 projects more or less downwards with respect to the wall 75 with its own beveled edge adapted to penetrate into the material of the layer S0 until it is in contact with the belt conveyor, while the porous wall 75 must touch the layer S0. This is obtained through suitable relative adjustments between the press and the loader assembly and/or between the press and the equipment 55–57 and/or between the latter and the assembly of the conveyor 17.

The operation of the assembly is as follows.

Figure 1:
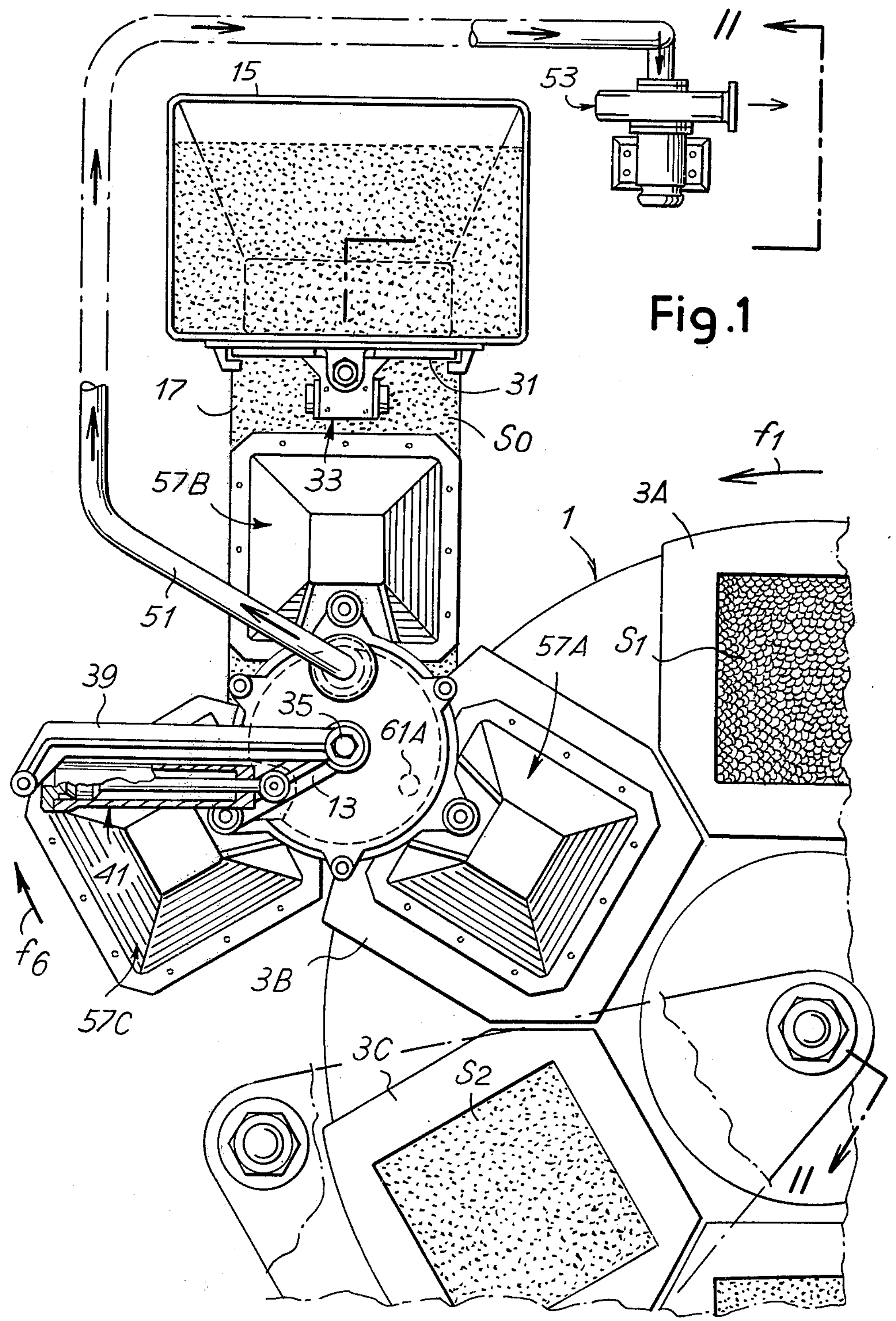
FIG. 1 is a partial top plan view of mold equipment with a metering device according to the invention in a first position of operation.

In a first or initial phase of operation, the various elements of the invention are in the position shown in FIGS. 1 and 2. In this position, the bell in position 57B is opened towards the atmosphere due the presence of the recess 61C in correspondence of the connection 63 of this bell 57B. The bell in position 57A is exposed to underpressure or suction through its own connection, the bore 61A and the collector 47A, 47. The bells of the equipment 55 are raised above the layer S0, and the layer S1, and the frame 3B. The bell in position 57A holds the quantity of underlayer S2 between the edge 71 and the wall 75, the holding of the material being due to the depression or underpressure in the bell and therefore to the suction of air through the material of the layer S2. The equipment 55 being raised, the pin 45 engages both appendixes 61B, 55B. In this arrangement or position, the table 1 has been moved and in the position 3B a mould has arrived which is to receive an underlayer S2.

In the subsequent or next phase (FIG. 3) the cylinder-piston system 65, 67 lowers the equipment 55 centering it with the pin 69, so as to ensure the exact penetration of the edge 71 of the bell into position 57A inside the frame in position 3B. The bell 57A is lowered then in the frame while still holding the layer S2, and the bell in position 57B penetrates with its own edge 71 in the layer S0, and the bell 57B still standing at atmospheric pressure. The penetration of the edge 71 into the layer S0 must be such as to contact the conveyor 17, and the adjustment of the edge 71 itself is obtained through the selection of the thicknesses 73. The pin 45 maintains the appendix 61B of the shutter engaged, but loses its hold on the appendix 55B.

Figure 3:
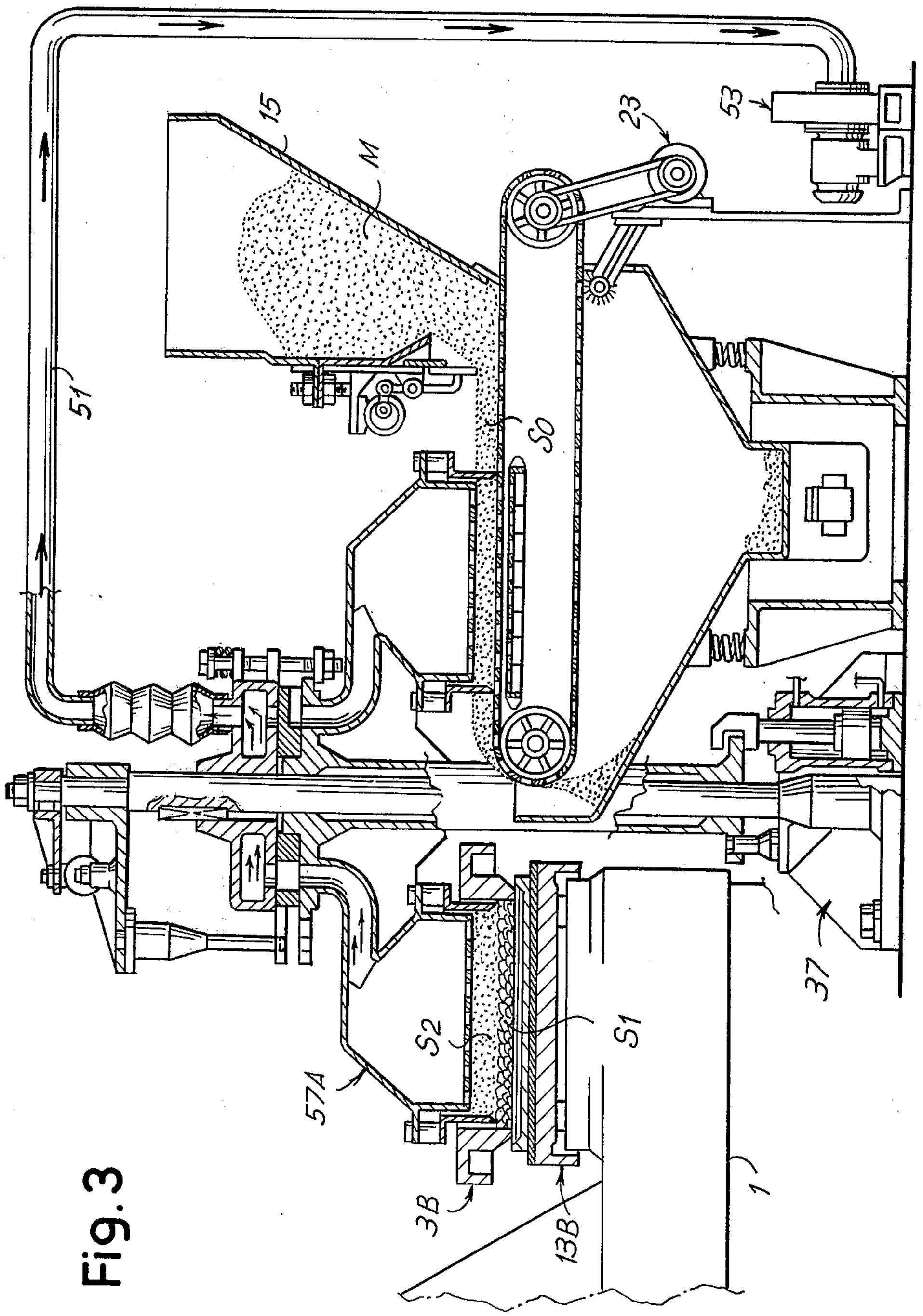
FIG. 3 is similar to FIG. 2, but shows a second phase of operation.
Figure 4:
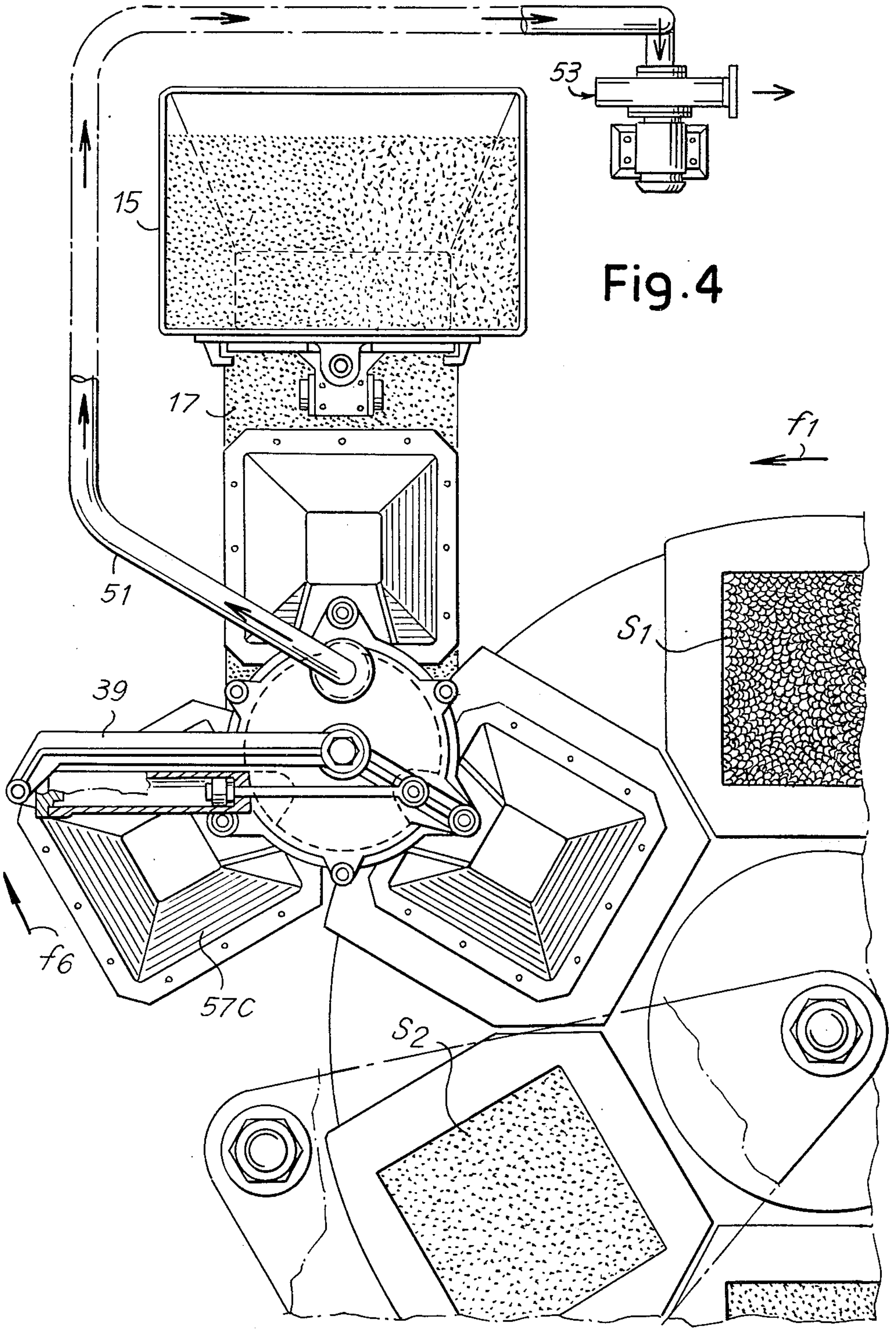
FIGS. 4 and 5 are similar to FIGS. 1 and 2, respectively, but show an array corresponding to a third phase of operations.
Figure 5:
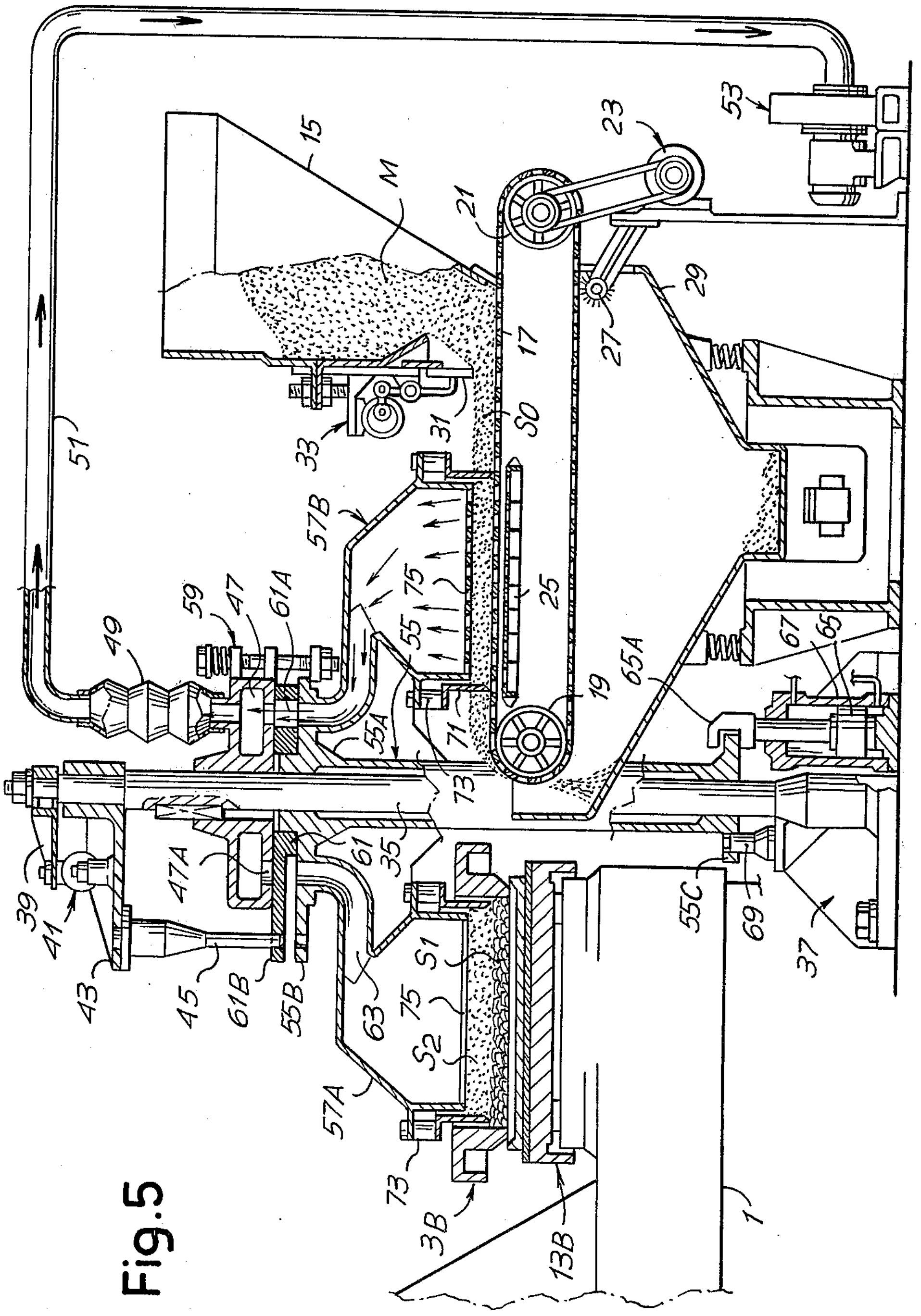

From this array of FIG. 3 in a third phase the array of FIGS. 4 and 5 is reached. In this array the bells maintain the position already reached in FIG. 3, but the distributor 61 was moved from the position of FIG. 1 to the position of FIG. 4 by virtue of the cylinder-piston system 41. In this way the communication between the bells in position 57B and the conduit 51 is obtained, thereby the material defined by the edge 71 of the bell sticks against the porous wall 75 by the effect of the air stream flowing across the conveyor belt 17 and the permeable support 25. Conversely, the bell in position 57A reaches the atmospheric pressure because of the passage of air towards this bell starting from the recess 61C. If a layer of material S2 was kept sticking against the wall 75 by means of the suction effected by the bell 57A, this material of layer S2 falls, or, more specifically is laid down upon the layer S1 of the mould in position 3B, within whose frame the edge 71 of the bell stay in position 57A.

Figure 6:
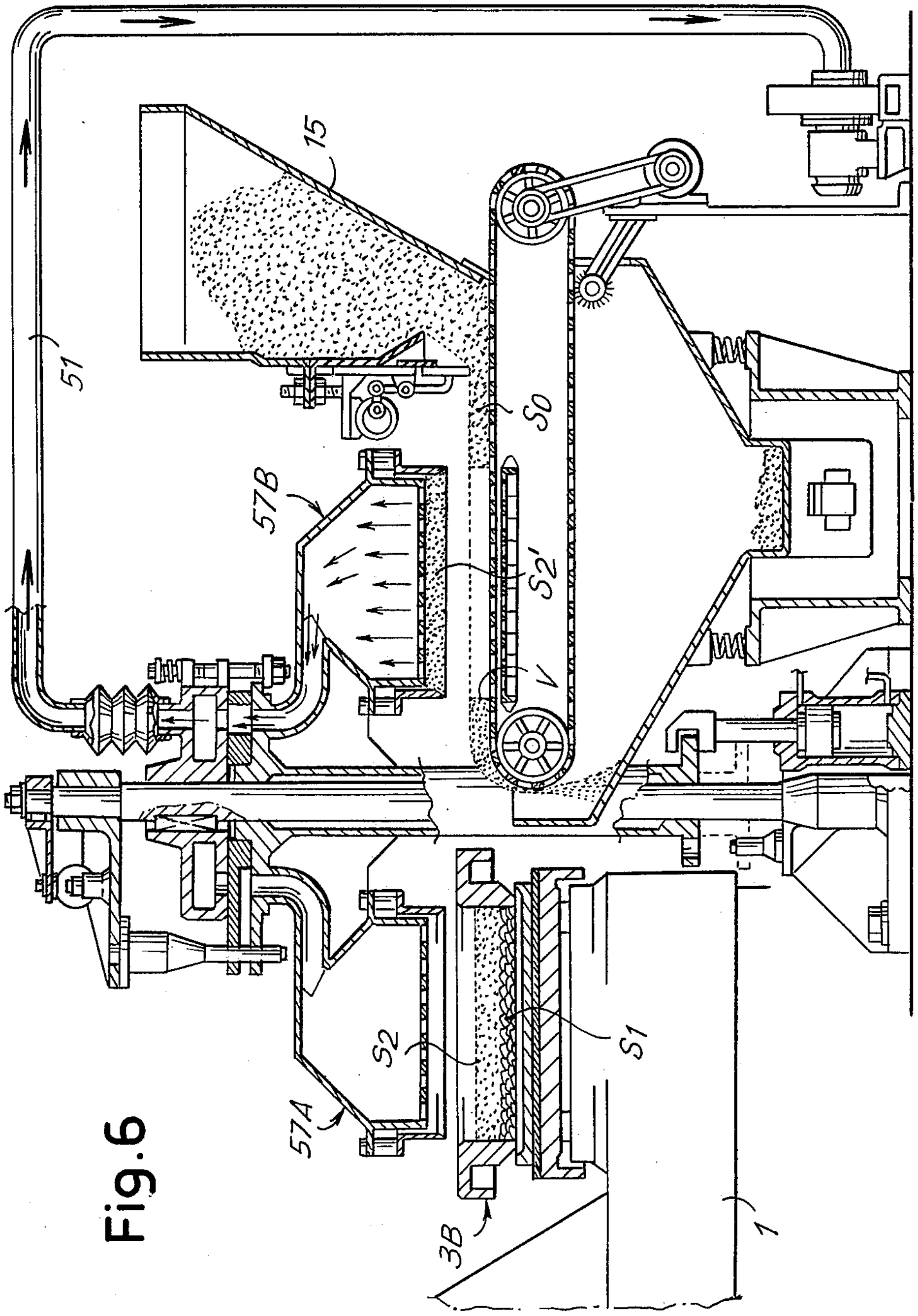
FIG. 6 is similar to FIGS. 2, 3 and 5 and shows an array corresponding to a fourth phase of operation.

In a fourth phase (see FIG. 6) the cylinder-piston system 65, 67 raises the equipment 55, 55A and then the bells 57 to reach the position shown in FIG. 6. With respect to the condition shown in FIG. 5, there is a layer S2' raised with the porous wall 75 of the bell in position 57B and the raising of the bell 57A without the layer S2, which remains laid down upon the layer S1 of the mould in position 3B.

In the above conditions an angular motion of the table 1 occurs at an angular length between two subsequent moulds, so that a mould that contains only the layer S1 reaches position 3B, while the mould with the layers S1 and S2 is moved to a subsequent pressing or vibration position. The equipment 55, 55A simultaneously shifts for 120° according to arrow f6 and by virtue of the control of the cylinder-piston system 41 which carries the equipment integral with the bells and the distributor 61, since the pin 45 for raising the equipment 55, 55A has engaged again, besides the appendix 61B, also that 55B. As a consequence, the bell which was before in the position 57A shifts to the waiting or cleaning position 57C, since the same bell is without the material S2. The bell previously positioned at 57B moves with the layer S2' to the position 57A above the new mould which reaches the position 3B, 13B; and the bell previously located in the waiting position 57C reaches the position 57B. Thus, the starting conditions of a new cycle are reached again as shown in FIGS. 1 and 2.

Meanwhile the conveyor belt 17 was advanced so as to again position the continuous layer S0 under the bell in the position 57B and to mask the empty region V, shown in FIG. 6, and due to the drawing of the layer S2' through the bell 57B, raised in the array of FIG. 6. The excess of material which passed below the position 57B of the bells (to ensure a uniform layer S0 for a new drawing) falls into the hopper 29 and can be raised again within the hopper 15. Practically, in this fifth phase, the same conditions of FIGS. 1 and 2 are actually reached again, except the shift for 120° of the equipment 55, 55A of the bells 57 and the angular shift of the mould table equal to the distance between subsequent moulds.

From this position a new cycle to lay down the just raised layer S2' and to draw a new layer S2 is resumed.

It is evident that the described equipment allows reduced times and therefore the increase of the working rhythms with an acceleration of the production, while, however, excessive accelerations and speeds of the cyclic motion elements is not required.

While a specific embodiment of the invention has been shown and described in detail to illustrate the application of the principles of the invention, it will be understood that the invention may be embodied otherwise without departing from such principles.

What is claimed is:

1. An apparatus for supplying loose material for preparing tile-size dosages of the material comprising, a conveyor for receiving a continuous layer of the loose material, loose material supply means associated with said conveyor for supplying a continuous layer of loose material to said conveyor, first drive means connected to said conveyor for intermittently driving said conveyor for intermittently moving the layer into a drawing position, at least one material drawing bell having a porous diaphragm and a peripheral edge extending outwardly therefrom for receiving a tile-size dosage of the material, second drive means connected to said material drawing bell for moving said bell toward said conveyor to receive a tile-size dosage of the material from the continuous layer of loose material on the conveyor when said conveyor is not being driven, and suction means connected to said material drawing bell for establishing an underpressure in the bell to support the tile-size dosage of material against the porous diaphragm, said conveyor comprising an endless belt conveyor.

2. An apparatus for supplying loose material for preparing tile-size dosages of the material comprising, a conveyor for receiving a continuous layer of the loose material, loose material supply means associated with said conveyor for supplying a continuous layer of loose material to said conveyor, first drive means connected to said conveyor for intermittently driving said conveyor for intermittently moving the layer into a drawing position, at least one material drawing bell having a porous diaphragm and a peripheral edge extending outwardly therefrom for receiving a tile-size dosage of the material, second drive means connected to said material drawing bell for moving said bell toward said conveyor to receive a tile-size dosage of the material from the continuous layer of loose material on the conveyor, and suction means connected to said material drawing bell for establishing an underpressure in the bell to support the tile-size dosage of material against the porous diaphragm, said loose material supply means comprising a feed box positioned above the conveyor and thickness adjustment means connected to said feedbox for adjustable establishing a thickness of the continuous layer of loose material on said conveyor, said thickness adjustment means comprising a scraper blade movably mounted on said feedbox and means for vibrating said blade.

3. An apparatus for supplying loose material for preparing tile-size dosages of the material comprising, a conveyor for receiving a continuous layer of the loose material, loose material supply means associated with said conveyor for supplying a continuous layer of loose material to said conveyor, first drive means connected to said conveyor for intermittently driving said conveyor for intermittently moving the layer into a drawing position, at least one material drawing bell having a porous diaphragm and a peripheral edge extending outwardly therefrom for receiving a tile-size dosage of the material, second drive means connected to said material drawing bell for moving said bell toward said conveyor to receive a tile-size dosage of the material from the continuous layer of loose material on the conveyor, and suction means connected to said material drawing bell for establishing an underpressure in the belt to support the tile-size dosage of material against the porous diaphragm, said conveyor comprising an endless air-permeable belt conveyor.

4. An apparatus according to claim 3, including an air-permeable support member positioned below said air-permeable endless belt in the vicinity of the drawing position.

5. An apparatus for supplying loose material for preparing tile-size dosages of the material comprising, a conveyor for receiving a continuous layer of the loose material, loose material supply means associated with said conveyor for supplying a continuous layer of loose material to said conveyor, first drive means connected to said conveyor for intermittently driving said conveyor for intermittently moving the layer into a drawing position, at least one material drawing bell having a porous diaphragm and a peripheral edge extending outwardly therefrom for receiving a tile-size dosage of the material, second drive means connected to said material drawing bell for moving said bell toward said conveyor to receive a tile-size dosage of the material from the continuous layer of loose material on the conveyor, and suction means connected to said material drawing bell for establishing an underpressure in the bell to support the tile-size dosage of material against the porous diaphragm, said conveyor being supported against the drawing position by an air-permeable support member.

6. An apparatus for supplying loose material for preparing tile-size dosages of the material comprising, a conveyor for receiving a continuous layer of the loose material, loose material supply means associated with said conveyor for supplying a continuous layer of loose material to said conveyor, first drive means connected to said conveyor for intermittently driving said conveyor for intermittently moving the layer into a drawing position, at least one material drawing bell having a porous diaphragm and a peripheral edge extending outwardly therefrom for receiving a tile-size dosage of the material, second drive means connected to said material drawing bell for moving said bell toward said conveyor to receive a tile-size dosage of the material from the continuous layer of loose material on the conveyor, and suction means connected to said material drawing bell for establishing an underpressure in the bell to support the tile-size dosage of material against the porous diaphragm, and a collection feed box disposed below an end of said conveyor for receiving the loose material intermittently moved on said conveyor and which has not been drawn into tile-size dosages by said material drawing belt.

7. An apparatus according to claim 6, further including means for moving the loose material collected in said collection feed box to said former-mentioned feed box.

* * * * *